Feb. 28, 1939. W. G. H. FINCH 2,149,136
TELEPICTURE SCANNING SYSTEM
Filed June 10, 1936 3 Sheets-Sheet 2
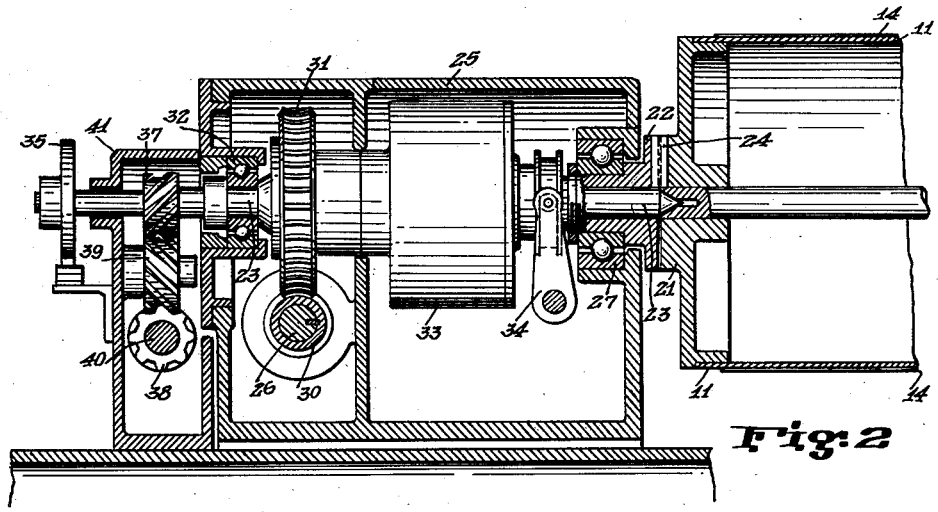
Fig. 2
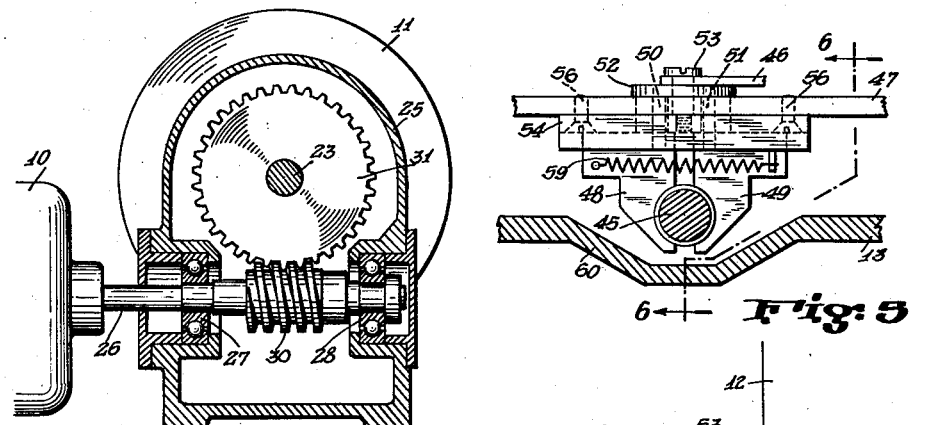
Fig. 3
Fig. 5
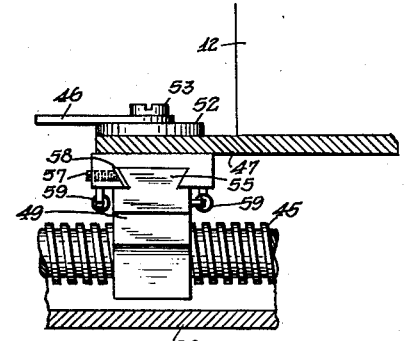
Fig. 6
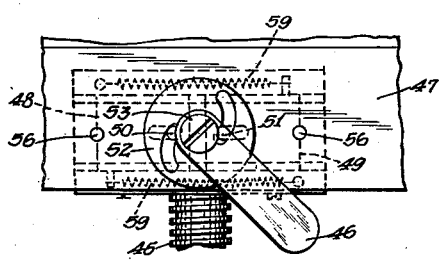
Fig. 7
INVENTOR.
William G. H. Finch
BY
Samuel Ostrolenk
ATTORNEY.

Feb. 28, 1939.  W. G. H. FINCH  2,149,136
TELEPICTURE SCANNING SYSTEM
Filed June 10, 1936  3 Sheets-Sheet 3

INVENTOR.
William G. H. Finch
BY
Samuel Ostrolenk
ATTORNEY.

Patented Feb. 28, 1939

2,149,136

UNITED STATES PATENT OFFICE 2,149,136

TELEPICTURE SCANNING SYSTEM

William G. H. Finch, New York, N. Y.

Application June 10, 1936, Serial No. 84,426

2 Claims. (Cl. 178—13)

This invention relates to telepicture scanning systems and more particularly to novel drive mechanism for the scanner carriage of a telepicture unit, and is a continuation in part of my application Serial No. 65,869, filed February 26, 1936, which matured into Patent No. 2,047,863, on July 14, 1936.

It is among the objects of my present invention to simplify the driving arrangement for the telepicture apparatus as disclosed in the patent referred to; to eliminate bulky reduction gearing and to provide a scanner carriage drive system which has small gearing readily encloseable and in which the scanner drive and drum drive are interconnected by a simple shaft; and to provide ball bearing mountings for the rotating members.

Other objects of my present invention relate to improved methods for mounting the movable carriage of the telepicture apparatus to eliminate objectionable transverse vibrations of the carriage which would spoil the detail of the pictures; and to improve and simplify the scanner carriage driving mechanism.

These and other objects of my invention will become apparent in connection with the following description taken in connection with the drawings, in which:

Figure 2 is a cross-sectional view taken along 2—2 of Figure 1 showing the driving connections from the motor to the telepicture drum.

Figure 3 is a cross-sectional view taken along 3—3 of Figure 1 showing the drive mechanism at the motor shaft.

Figure 5 is the cross-sectional view taken along 5—5 of Figure 1 through the worm lock mechanism connecting the scanner carriage with its worm drive shaft.

Figure 6 is the end elevation as viewed from 6—6 of Figure 5 of the worm-lock.

Figure 7 is a plan view in dotted lines of the worm-lock.

Figure 1:
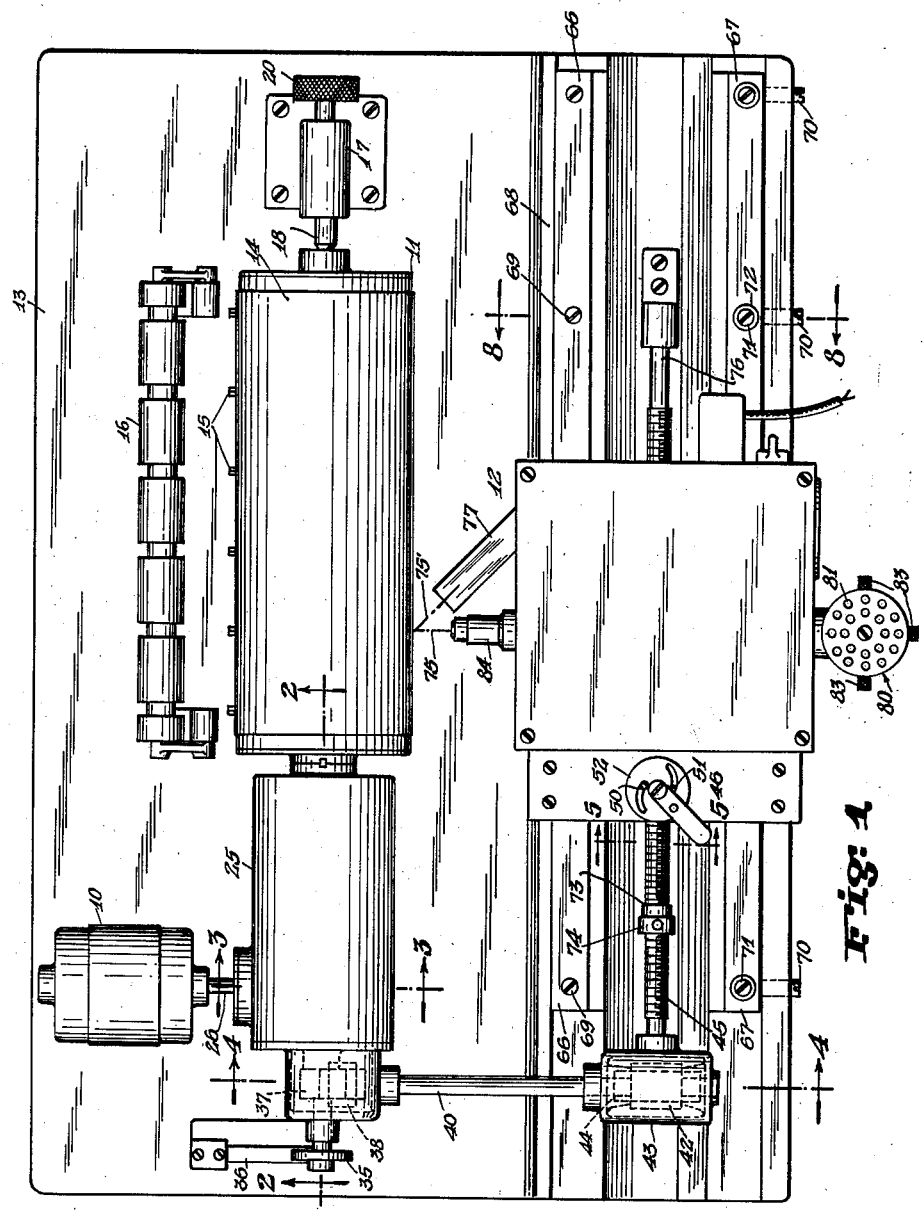
Figure 1 is a plan view of a preferred embodiment for a telepicture apparatus.

Referring to Figure 1, motor 10 is the source of motive power for driving the telepicture drum 11 and the scanner carriage 12 in a manner to be described in detail. The telepicture apparatus is supported on a cast iron base 13. I have illustrated a telepicture transmitter apparatus as the preferred embodiment of my present invention, although it will be evident that the principles herein disclosed may be equally well employed in a telepicture receiver apparatus.

The picture 14 to be transmitted is mounted upon the rotatable drum 11 and is held in position thereon by the sheet clamping members 15. The presser rollers 16 are adapted to be pressed against the sheet 14 while it is mounted in position on drum 11 to facilitate smooth and even mounting thereon. The right end 19 of drum 11 is rotatably supported in tail stock 17, the pointed spindle 18 of which projects into the corresponding cavity in the end 19 of drum 11. Tail stock 17 has a thumb screw 20 for manually moving the spindle 18 out of engagement with the drum against a spring action. Details of the drum 11 and its associated mechanism are described in detail in my patent referred to.

Figure 2 illustrates the connection of the left end 21 of drum 11 to the face plate driver 22 for the drum. A pointed shaft 23 concentric with the face plate driver 22 and rigidly attached thereto, projects into a central opening of the left end 21 of drum 11 to correspondingly support the drum. A projection or a key member 24 is interposed between the face plate driver 22 and the drum flange 21.

A housing 25 encloses and supports the driving connection between the motor shaft 26 and the face plate driver 22 for the drum 11. Ball bearing 27 mounted upon one side of housing 25 rotatably supports the face plate driver 22 and also the shaft 23 within face plate driver 22. The driving connection between the motor 10 and the drum 11 is as follows:

Referring to Figure 3, motor drive shaft 26 extends transversely across the housing 25 and is supported in opposite sides of the housing 25 in corresponding roller bearings 27 and 28. A worm 30 is keyed to the motor shaft 26. A worm gear 31 coacts with worm 30 and is continually driven at a predetermined reduced speed with respect to the motor shaft 26. Worm gear 31 is rotatably supported on the left end portion of the shaft 23. The left end of shaft 23 is supported in roller bearing 32 mounted at the left end of housing 25, as shown in Figure 2; the right end portion of shaft 23 being rotatably supported in ball bearing 27. Worm 31 drives the shaft 23 through a clutch member 33 interposed therebetween. Details of the clutch connection 33 shown in elevation and the manner of operating it by lever 34 are fully described in my patent already referred to.

When the clutch 33 is in engaged position, drum 11 is rotated at a predetermined rate with respect to the normal speed of the motor 10, determined by the reduction ratio between shaft 26 and worm gear 31. Motor 10 is preferably a synchronous motor connected to a central alternating current distribution system. Drum 11 may, for example, be driven at one hundred revolutions per minute while motor 10 is rotating at eighteen hundred revolutions per minute. The shaft 23 projects through the right end of housing 25 and contains a synchronizing cam 35 which operates the synchronizing cam switch 36 connected to the transmitting circuit for transmitting periodic synchronizing impulses for maintaining the receiver drum in proper phase synchronism, in a manner described in my application Serial No. 65,869 already referred to.

A pinion 37 having skew teeth is attached to the shaft 23 and drives a corresponding skew pinion 38 through an intermediate idler skew pinion 39. The pinions 37, 38 and 39 are arranged so that pinions 37 and 38 rotate in a one-to-one speed relationship but the orientation of shaft 23 of pinion 37 is at right angles to that of shaft 40 of pinion 38. Shaft 40 is the connecting drive shaft of the drum driving mechanism illustrated in Figure 2 and the scanner carriage 12 drive mechanism in a manner hereinafter described.

Figures 4, 8:
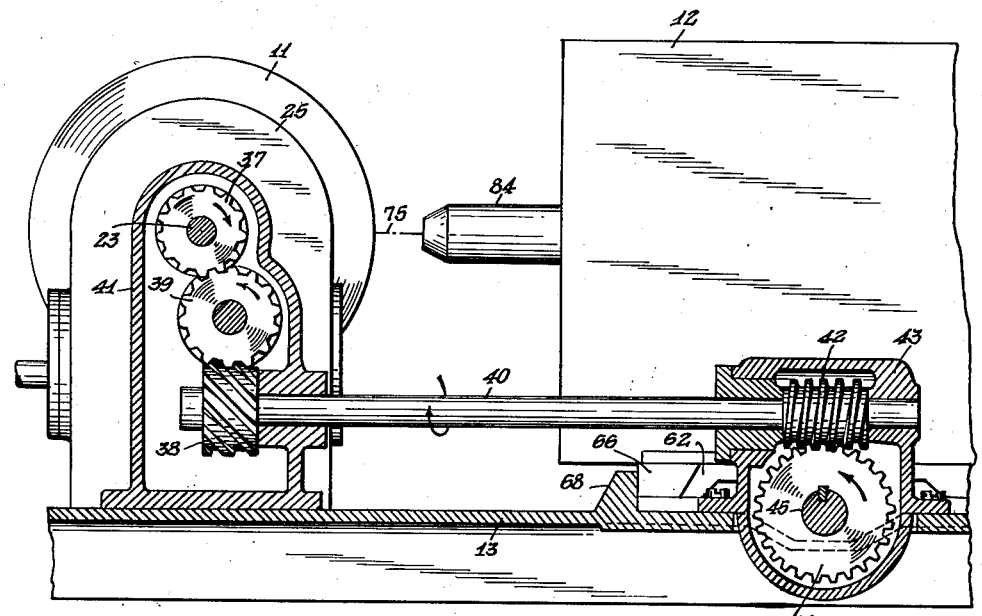
Figure 4 is a cross-sectional view taken along 4—4 of Figure 1 showing the drive connection between the drum drive shaft and the scanner carriage drive shaft.
Figure 8 is a cross-sectional view taken along 8—8 of Figure 1 showing details of the carriage slide and supporting mechanism.

Referring to Figure 4 which is a cross-sectional view through the drum and carriage drive interconnection by shaft 40 taken along 4—4 of Figure 1, another view of the co-acting pinions 37, 38 and 39 is had. Shaft 40 is oriented in a direction perpendicular to that of the drum 11 drive shaft axis. An auxiliary housing 41 encloses the pinion 37 and 39. A worm 42 is attached to the carriage end of shaft 40 and is enclosed in its housing 43 which also supports the corresponding end of the shaft 40.

A worm gear 44 keyed to the worm drive shaft 45 meshes with and is driven by the worm 42. The bottom portion of worm gear 44 projects below the surface of the cast iron base 13 in order that the axis of the worm drive shaft 45 may be oriented at approximately the level of the surface of the base with the advantages to be hereinafter described. The worm drive shaft 45 is parallel to the axis of the drum 11. The rate of rotation of the worm drive 45 is directly correlated with the rotation of drum 11 since it is directly connected thereto by a positive drive connection including the connecting shaft 40 and the drive shaft 23. Worm drive shaft 45 is rotated at a predetermined reduced ratio with respect to the speed of drum 11 in order to cause carriage 12 to move at proper speed. Assuming picture detail corresponding to 100 lines scanned per inch, the carriage 12 is moved at one inch per minute corresponding to 100 revolutions of drum 11. Carriage 12 will accordingly move .01 inch during each revolution of drum 11.

Carriage 12 is connected to worm drive shaft 45 by a positive driving connection consisting of a worm lock arrangement. Figure 5 is a cross-sectional view taken along 5—5 of Figure 1 through worm lock mechanism which is operated by the cam lever 46. The worm lock is mounted on a plate 47 extending from the bottom of carriage 12. The worm lock essentially comprises two members 48 and 49 which co-act upon opposite sides of the worm drive shaft 45. The co-acting surfaces of members 48 and 49 and the worm 45 are threaded to correspond to the worm in order to be driven thereby when in meshing relation. Pins 50 and 51 project from corresponding members 48 and 49 through the extension plate 47 into corresponding grooves in the cam lever plate 52. The cam lever 46 and its plate 52 is rotatably supported by screw member 53 threaded in guide plate 54.

Operation of the cam lever 46 will correspondingly rotate the cam plate 52 to cause the pins 50 and 51 to optionally move together or apart. The cam lock members 48 and 49 are accordingly moved to engage or disengage the worm drive shaft 45. Figure 6 is a side elevational view of the worm lock mechanism, particularly illustrating the dove-tail guiding support 54 and the worm lock member corresponding dove-tail projection 55. The support 54 is attached to the extension plate 47 by screw members 56. Set screws 57 are arranged at one side of the guide support 54 in order to adjust the pressure of a wear plate 58 against the dove-tail engagement of the lock members 48—49 with the support 54.

Figure 7 is a plan view of the worm lock mechanism showing the springs 59 mechanically biasing the worm lock members 48 and 49 toward each other to facilitate their engagement upon the worm shaft 45 when cam lever 46 is rotated to engaging position.

The axis of worm drive shaft 45 is substantially on the level of the surface of the cast iron base 13 as clearly illustrated in Figure 5. The corresponding base portion 60 is accordingly depressed beneath the worm shaft 45 to permit the lowered drive shaft arrangement. The lower position of the worm drive shaft 45 permits the center of gravity of the scanner carriage 12 to be positioned closer to the base 13 of the apparatus. The lower center of gravity minimizes any tendency for vibrations of the carriage.

Further provisions for eliminating vibration, particularly transverse vibration of the carriage 12, are illustrated in detail in Figure 8. A member 61 is secured to the bottom of the carriage 12. The end portions 62 and 63 of member 61 project from the bottom of carriage 12 and are arranged to coact with corresponding guide tracks. The bottom surfaces of projecting ends 62 and 63 are parallel with the surface of the base 13 and glide upon corresponding polished steel plates 64 and 65. The weight of carriage 12 is supported by the horizontal sliding action of the member 61 upon the polished and oiled steel plates 64 and 65. It is to be understood that the cross-section of the member 61 is continuous across the bottom of the carriage 12 of shape as viewed from Figure 8.

The outer inclined surfaces of the end portions 62 and 63 co-act with corresponding steel tracks 66 and 67. Track 66 is permanently secured to base 13 against projection 68 cast integral with the base 13 by screw members 69. The position of track 67 is adjustable transversely against the inclined surface of end portion 63. The horizontal position of track 67 is adjusted by means of a plurality of set screws 70 at the side thereof. The holes for the screws 71 are elongated to permit realignment of the track 67 by the set screws 70. A washer 72 under the head of screw 71 covers up the widened screw hole as shown in Figure 8.

Carriage 12 is moved parallel to the axis of the rotating drum 11 during a scanning operation. The propelling force for carriage 12 is obtained by the powerful drive at the worm lock 48—49 by the worm drive shaft 45. The tracks for the projections 62 and 63 are polished and well oiled to prevent frictional interference. The novel arrangement for the carriage 12 guiding members substantially eliminates transverse movements of the carriage scanning mechanism with respect to the drum 11. Any wear or misalignment of the guiding structure for the carriage member 61 is taken up or otherwise adjusted by the adjustable track 67.

A rubber bumper 73 (Figure 1) secured in a steel collar 74 mounted on the right end portion of worm shaft 45 limits the movement of the carriage 12 towards the left. The optical beam 75 emanating from carriage 12 is adjustable along any portion of drum 11 even while drum 11 is rotating by the operation of the cam lever 46 for disengaging and engaging the worm lock upon the worm 45. The diameter of the right end portion 76 of worm drive shaft 45 is reduced so that when carriage 12 reaches the extreme right end position, the driving effect of the worm shaft 45 upon the worm lock of the carriage 12 is discontinued.

The preferred embodiment for the telepicture apparatus comprises a telepicture transmitter. The picture record 14 to be transmitted is successively traced by a light beam 75 continuously scanned in a progressive helical manner. The refracted light beam 75' the intensity of which varies in accordance with the elemental shading of the picture record being traversed, is concentrated by a lens system 77 to actuate a photoelectric cell, within the carriage 12. Further details of the electrooptical system and the circuits for transmitting the generated telepicture signals are disclosed in my co-pending application Serial No. 65,869 referred to above.

The light beam 75 is generated by a powerful electric lamp located within the air-cooled adjustable housing 80 attached to the back side of the carriage 12. The cap 81 contains a series of perforations to permit air circulation but contains light baffles to prevent light rays from the lamp within from projecting through. A partial elevational view of the lamp housing is shown in Figure 8. A series of holes 82 is arranged about the housing near the bottom portion to admit air which circulates through the bulb out through the perforated cap 81. Thumbscrews 83 permit accurate alignment of the filament of the signal lamp with respect to the axis of the optical system 84. A flexible cable 85 connects the signal lamp within the lamp housing 80 to a source of current. Details of the lamp housing 80 and the construction of the optical system within the carriage 12 and means for readily and accurately adjusting the optical system formed the basis of my co-pending application Serial No. 82,713, filed June 1, 1936, which matured into Patent No. 2,100,161, on Nov. 23, 1937.

I claim:

1. In a telepicture apparatus having a rotatable drum and an optical scanner carriage accurately focussed on the drum and movable in a path parallel to the axis of the drum for scanning thereof: horizontal means for supporting and guiding said carriage along said path in a manner which does not vary the focussing distance between the optical scanner and the drum throughout the scanning movement comprising a member secured to the bottom of said carriage having opposed projecting side portions parallel to the path of carriage travel, a pair of tracks secured to the base of the apparatus for coacting with said projecting end portions to guide the carriage parallel to said drum axis, and mechanism coextensive with said tracks for accurately adjusting the path between said tracks for said carriage member individually along successive spaced portions of the path and in a direction parallel to the direction of said scanner focussing whereby a substantially smooth and continuous movement of said carriage is assured with substantially uniform pressure of said carriage member against both of said tracks and a substantially constant focal adjustment between said carriage and said drum throughout the scanning movement of the carriage is effected.

2. In a telepicture apparatus having a rotatable drum and an optical scanner carriage accurately focussed on the drum and movable in a path parallel to the axis of the drum for scanning thereof: horizontal means for supporting and guiding said carriage along said path in a manner which does not vary the focussing distance between the optical scanner and the drum throughout the scanning movement comprising a member secured to the bottom of said carriage having opposed projecting side portions parallel to the path of carriage travel, a pair of tracks secured to the base of the apparatus for coacting with said projecting end portions to guide the carriage parallel to said drum axis, and mechanism coextensive with said tracks for accurately adjusting the path between said tracks for said carriage member individually along successive spaced portions of the path and in a direction parallel to the direction of said scanner focussing whereby a substantially smooth and continuous movement of said carriage is assured with substantially uniform pressure of said carriage member against both of said tracks and a substantially constant focal adjustment between said carriage and said drum throughout the scanning movement of the carriage is effected, said mechanism including an element coactable with said carriage member when positioned between said tracks and having a plurality of spaced openings elongated in the direction parallel to said focussing direction, and screw means for aligning and securing said element in position on said apparatus base operable against said element and through said elongated openings.

WILLIAM G. H. FINCH.